United States Patent
Ge et al.

(10) Patent No.: US 8,145,745 B1
(45) Date of Patent: Mar. 27, 2012

(54) METHOD AND APPARATUS FOR NETWORK-LEVEL ANOMALY INFERENCE

(75) Inventors: Zihui Ge, Secaucus, NJ (US); Albert Gordon Greenberg, Summit, NJ (US); Matthew Roughan, Erindale (AU); Yin Zhang, Austin, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 842 days.

(21) Appl. No.: 11/321,218

(22) Filed: Dec. 28, 2005

(51) Int. Cl.
*G06F 15/173* (2006.01)
(52) U.S. Cl. ...................................... 709/224
(58) Field of Classification Search ............. 709/224
See application file for complete search history.

(56) References Cited

U.S. PATENT DOCUMENTS

| | | | |
|---|---|---|---|
| 6,292,466 B1 * | 9/2001 | Droz | 370/232 |
| 2003/0097439 A1 * | 5/2003 | Strayer et al. | 709/224 |
| 2006/0173992 A1 * | 8/2006 | Weber et al. | 709/224 |

OTHER PUBLICATIONS

Lakhina et al., Diagnosing Network-Wide Traffic Anomalies, Aug. 30-Sep. 3, 2004, SIGCOMM'04, pp. 219-230.*
Network Anomography, Yin Zhang and et al., Aug. 12, 2005, USENIX.org, all sections http://www.usenix.org/event/imc05/tech/full_papers/zhang/zhang_html/paper.html.*

* cited by examiner

*Primary Examiner* — Ario Etienne
*Assistant Examiner* — Hee Kim

(57) ABSTRACT

Method and apparatus for network-level anomaly inference in a network is described. In one example, link load measurements are obtained for multiple time intervals. Routing data for the network is obtained. Link level anomalies are extracted using temporal analysis on the link load measurements over the multiple time intervals. Network-level anomalies are inferred from the link-level anomalies.

20 Claims, 3 Drawing Sheets

METHOD AND APPARATUS FOR NETWORK-LEVEL ANOMALY INFERENCE

BACKGROUND OF THE INVENTION

1. Field of the Invention

Embodiments of the present invention generally relate to network monitoring systems and, more particularly, to a method and apparatus for network-level anomaly inference.

2. Description of the Related Art

Today's networks are large, geographically distributed and constantly evolving. Currently anomaly detection is limited to anomaly detection at individual sites or links. However, network-wide views of traffic matrices are critical inputs for all manual or automated processes for large networks, including demand forecasting, capacity planning, traffic and network engineering, and operational maintenance. Going beyond anomaly detection at the link level to explanation at the network level via widely available network data would provide the necessary network-wide views. Therefore, there exists a need in the art for network-level anomaly inference.

SUMMARY OF THE INVENTION

Method and apparatus for network-level anomaly inference in a network is described. In one embodiment, link load measurements are obtained for multiple time intervals. Routing data for the network is obtained. Link level anomalies are extracted using temporal analysis on the link load measurements over the multiple time intervals. Network-level anomalies are inferred from the link-level anomalies.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
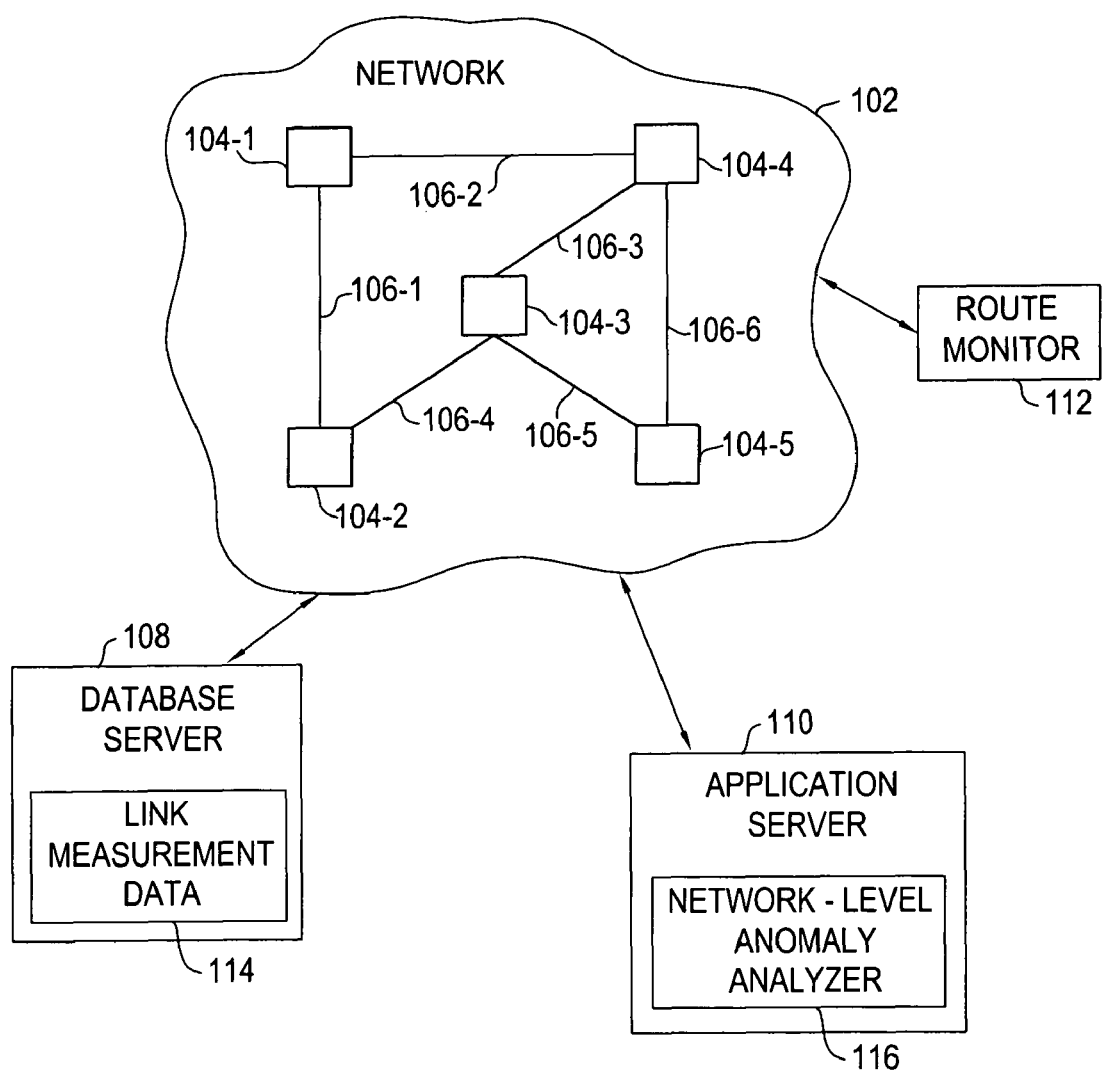
FIG. 1 is a block diagram depicting an exemplary embodiment of a network architecture in accordance with one or more aspects of the invention.

FIG. 1 is a block diagram depicting an exemplary embodiment of a network architecture 100 in accordance with one or more aspects of the invention. The network architecture 100 illustratively comprises a network 102, routers 104-1 through 104-5 (collectively referred to as routers 104), links 106-1 through 106-6 (collectively referred to as links 106), a database server 108, a route monitor 112, and an application server 110. The network 102 comprises a packet network configured to propagate packets in accordance with a particular network protocol, such as internet protocol (IP), and transport protocol, such as transmission control protocol (TCP), user datagram protocol (UDP), and the like.

The routers 104 are interconnected by the links 106. Each of the routers is configured to provide link load (i.e., traffic volume) measurements at predefined time intervals for storage in the database server 108. For example, the routers 104 may employ the simple network management protocol (SNMP) to provide the link load measurements to a network management server 109, which stores link measurement data 114 in the database server 108. Operation of SNMP to collect such data is well known in the art.

The routers 104 employ routing protocols to facilitate the exchange of routing information. The routing protocols are used to build forwarding tables in the routers 104. Exemplary routing protocols include interior gateway protocols (IGPs), such as open shortest path first (OSPF) or intermediate system to intermediate system (ISIS), and exterior gateway protocols (EGPs), such as the border gateway protocol (BGP). Operation of such routing protocols to exchange routing information is well known in the art. The route monitor 112 is configured to provide up-to-date measurements of network routing employed by the routers 104 ("routing data").

The application server 110 is configured to implement a network-level anomaly analyzer 116. The network-level anomaly analyzer 116 is configured to obtain link load measurements from the database server 108 and routing data from the route monitor 112 and to identify anomalous origin-destination (OD) flows network-wide. Operation of the network-level anomaly analyzer 116 is described below. Those skilled in the art will appreciate that the network architecture 100 is merely illustrative and that the network-level anomaly analyzer 116 may be employed in a myriad of network architectures. Notably, a typical large (e.g., Tier 1) network may include hundreds of routers and thousands of links. In general, the network-level anomaly analyzer 116 is configured to process link load measurements and routing data to identify anomalous OD flows network-wide.

Figure 2:
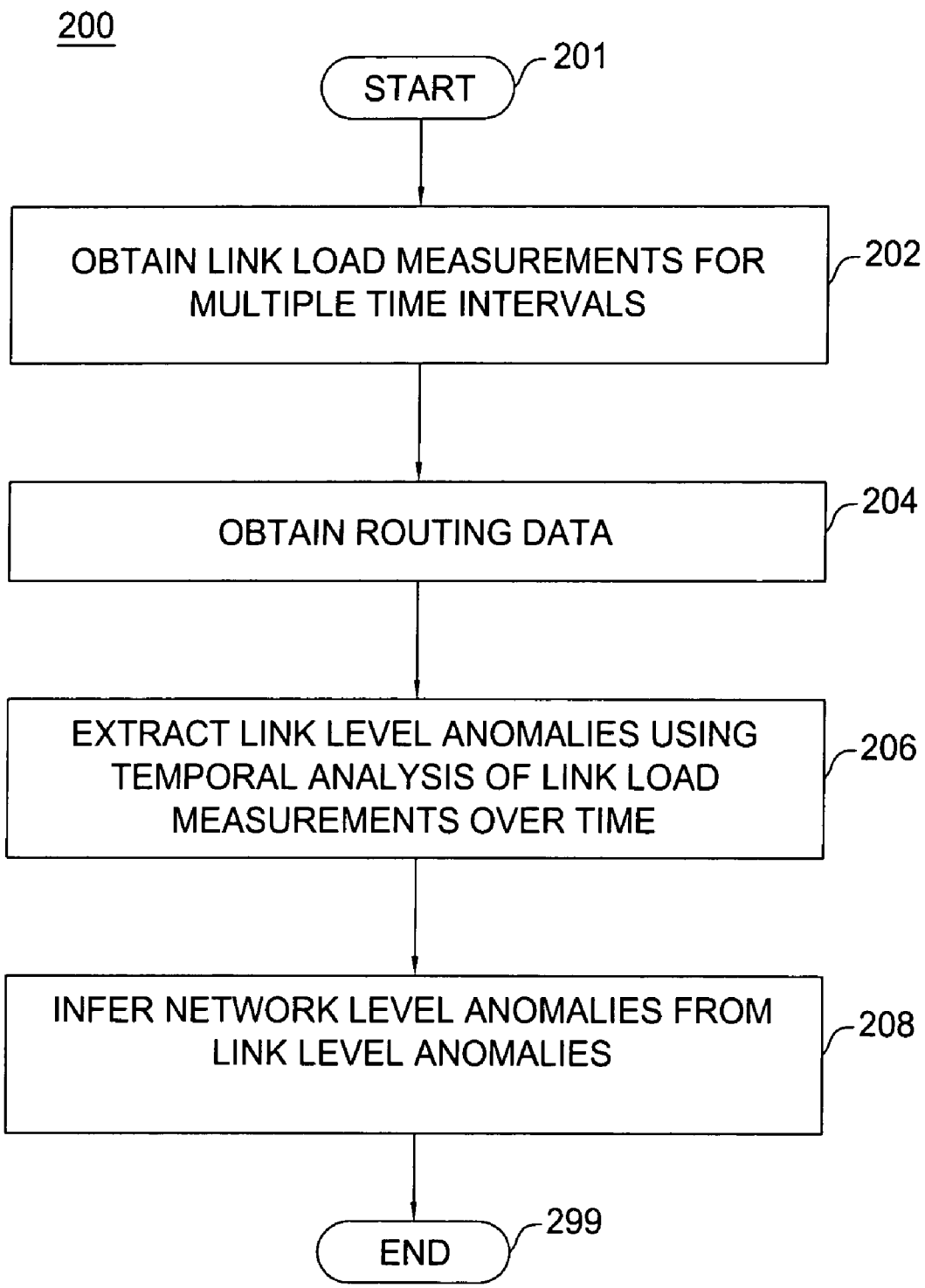
FIG. 2 is a flow diagram depicting an exemplary embodiment of a method for identifying network-level anomalies in accordance with one or more aspects of the invention.

FIG. 2 is a flow diagram depicting an exemplary embodiment of a method 200 for identifying network-level anomalies in accordance with one or more aspects of the invention. The method 200 may be employed by the network-level anomaly analyzer 116 of FIG. 1. The method 200 begins at step 201. At step 202, link load measurements are obtained for multiple time intervals. At step 204, routing data for the network is obtained. At step 206, link level anomalies are extracted using temporal analysis of link load measurements over time. At step 208, network level anomalies are inferred from the link level anomalies. The method 200 ends at step 299. Aspects of the method 200 are described in more detail immediately below.

In one embodiment of the invention, anomalies are extracted at the link level and explanations for the anomalies are inferred at the network-level, using a tomograhic approach. This process is referred to herein as network anomography. Network tomography describes several problems: inferring topology, or link performance of a network from end-to-end measurements, or inferring Origin-Destination (OD) traffic demands from link traffic measurements. These problems can be written using the following linear relationship:

$$b = Ax \qquad \text{Eq. 1,}$$

where b contains link load measurements, A is the routing matrix, and x includes the unknown traffic matrix elements written as a vector. For a network with n links, and m OD flows, we define the routing matrix to be the n×m matrix $A=[a_{ij}]$ where $a_{ij}$ indicates the fraction of traffic from flow j to appear on link i.

The problem of inferring the OD traffic-matrix is massively under-constrained: there will be approximately $N^2$ OD flows to estimate with only O(N) link measurements. Hence tomography methods seek to introduce additional information, often in the form of some kind of traffic model. Anomography problems are also highly under-constrained, but the models used to describe traffic are inappropriate for anomalies—by definition these events are generated by completely different processes from normal network traffic. Furthermore, in anomography, detection is combined with inference. In contrast, in standard network tomography problems, only a set of traffic matrix elements is inferred. Hence there are important differences between anomography and network tomography.

It is also important to note that routing matrices change over time. While routing matrices may be taken to be constant, in some cases it is important to allow for the fact that routing is not constant, and neither is the traffic. In order to allow for variable routing, the traffic measurements and the routing matrix are indexed over time. Thus, the relationship between the link traffic and OD traffic matrix may be represented ast:

$$b_j = A_j x_j \qquad \text{Eq. 2,}$$

where $A_j$ is an n×m routing matrix, $x_j$ is a length-n vector of unknown OD flow traffic volumes, and $b_j$ is a length-m vector of link loads, at time interval j.

In one embodiment, it is assumed that the routing matrices $A_j$ are time-invariant and are denoted by A. Under this assumption, we can combine all t linear systems (Eq. 2) can be combined into a single equation using matrix notation:

$$B = AX \qquad \text{Eq. 3,}$$

where $B=[b_1\ b_2 \ldots b_t]$ is the matrix formed by having $b_j$ as its column vectors, and $X=[x_1\ x_2 \ldots x_t]$ is the matrix with $x_j$ as its column vectors.

In the present embodiment, a late-inverse solution strategy to network anomography is employed. Whereas early-inverse solutions infer OD flow data from link load measurements and anomaly detection is applied, late-inverse approaches extract the anomalous traffic from the link load observation, then form and solve a new set of inference problems:

$$\tilde{B} = A\tilde{X} \qquad \text{Eq. 4,}$$

where $\tilde{B}=[\tilde{b}_1\ \tilde{b}_2 \ldots \tilde{b}_t]$ is the matrix of anomalous traffic in the observables, and $\tilde{X}=[\tilde{x}_1\ \tilde{x}_2 \ldots \tilde{x}_t]$ is the matrix of OD flow anomalies to be diagnosed, over t time intervals. The idea of the late-inverse method is to defer "lossy" inference to the last step.

While the new inference problems (Eq. 4) share the same linear-inverse structure as in network tomography (Eq. 3), the characteristics of the unknowns are different, and so is the solution strategy. A framework for late-inverse anomography methods is described. In this framework, $\tilde{B}$ is formed by multiplying B with a transformation matrix T. Depending on whether a left or right multiplying transformation matrix is used, the framework can be furthered divided into the following two classes: (1) spatial anomography, where a left multiplying transformation matrix T is used to form $\tilde{B}$, i.e., $\tilde{B}=TB$; and (2) temporal anomography, where a right multiplying transformation matrix T is used to form $\tilde{B}$, i.e., $\tilde{B}=BT$. It is worth noting a subtle distinction between spatial and temporal anomography. Temporal anomography has the nice property that it is self-consistent in that given B=AX and $\tilde{B}=BT$, a solution to Eq. 4 can always be obtained by setting $\tilde{X}=XT$. In other words, we can apply exactly the same analysis can be applied on B and on X to obtain the corresponding anomalies $\tilde{B}$ and $\tilde{X}$, respectively (i.e., the same transformation matrix T is used). Spatial anomography, in contrast, does not have this property, because with B=AX and $\tilde{B}=TB$, the formulated problem instance (Eq. 4) is not guaranteed to have a solution.

Four embodiments of temporal anomography analysis techniques for extracting anomalous traffic $\tilde{B}$ from link load observations B are disclosed, which include ARIMA modeling, Fourier analysis, Wavelet analysis, and temporal Principle Components Analysis (PCA). In general, the anomalous link traffic can be separated by performing temporal analysis on the time series of each link. Consider a set of link traffic data over time t: $B=[b_1\ b_2 \ldots b_t]$. The process of extracting anomalies by exploiting the temporal structure within the data points can be modeled as a linear transformation of the time series: $\tilde{B}=[\tilde{b}_1\ \tilde{b}_2 \ldots \tilde{b}_t]=BT$, where the transformation matrix T can be either explicit or implicit.

In one embodiment, autoregressive integrated moving average (ARIMA) modeling is used. The ARIMA methodology is a class of linear time-series forecasting techniques that capture the linear dependency of the future values on the past. It is able to model a wide spectrum of time-series behavior. An ARIMA model includes three order parameters: the autoregressive parameter (p), the number of differencing passes (d), and the moving average parameter (q). Models can be summarized as ARIMA(p,d,q). A model described as ARIMA(0,1,2) means that it contains p=0 (zero) autoregressive parameters and q=2 moving-average parameters, which were computed for the time series after it was differenced once (d=1).

A general ARIMA model of order (p, d, q) can be expressed as:

$$z_k - \sum_{i=1}^{p} \phi_i \cdot z_{k-i} = e_k - \sum_{j=1}^{q} \theta_j \cdot e_{k-i}, \qquad \text{Eq. 5}$$

where $z_k$ is obtained by differencing the original time series d times (when d≥1) or by subtracting the mean from the original time series (when d=0), $e_k$ is the forecast error at time k, $\phi_i$ (i=1, ..., p) and $\theta_j$ (j=1, ..., q) are the autoregression and moving average coefficients, respectively.

There are well known techniques for estimating the parameters p, d, q, $\phi_i$ and $\theta_j$ for a given time series, and given the parameters. The model is applied by predicting the terms $z_k$ and then estimating the prediction errors by $e_{k+1}=z_{k+1}-\hat{z}_{k+1}$, which then form the anomalous traffic (the traffic which does not fit the model). In practice, the parameters used in the ARIMA model are sometimes chosen to meet particular goals intended by the implementer, rather than being estimated from a particular data set. This is because the parameters of use in a particular data set may change over time. However, the present invention employs adaptive techniques to overcome this problem, as described below.

If the time series are considered to be vectors of length t, then the above results can be written in matrix form. Taking the measurements $b=(b_1, \ldots, b_t)^T$, the errors $e=(e_1, \ldots, e_t)^T$ can be obtained via right-multiplication by a transformation matrix $\tilde{b}^T=e^T=b^T T$. Specifically, let I denote the t×t identity matrix, $\nabla$ denote the "back shift" matrix, and 1 denote the t×t unit matrix, i.e., $$I = \begin{bmatrix} 1 & 0 & 0 & \ldots & 0 & 0 \\ 0 & 1 & 0 & \ldots & 0 & 0 \\ & & \ldots & & & \\ 0 & 0 & 0 & \ldots & 1 & 0 \\ 0 & 0 & 0 & \ldots & 0 & 1 \end{bmatrix},$$

$$\overline{V} = \begin{bmatrix} 0 & 1 & 0 & \ldots & 0 & 0 \\ 0 & 0 & 1 & \ldots & 0 & 0 \\ & & \ldots & & & \\ 0 & 0 & 0 & \ldots & 0 & 1 \\ 0 & 0 & 0 & \ldots & 0 & 0 \end{bmatrix}, \mathbf{1} = \begin{bmatrix} 1 & 1 & 1 & \ldots & 1 & 1 \\ 1 & 1 & 1 & \ldots & 1 & 1 \\ & & \ldots & & & \\ 1 & 1 & 1 & \ldots & 1 & 1 \\ 1 & 1 & 1 & \ldots & 1 & 1 \end{bmatrix}.$$

The differencing result, $z=[z_1 z_2 \ldots z_t]^T$, can then be represented by:

$$z^T = \begin{cases} b^T(I-\nabla)^d, & \text{for } d \geq 1, \\ b^T - \frac{1}{n}b^T \mathbf{1} = b^T\left(I - \frac{1}{n}\mathbf{1}\right), & \text{for } d = 0 \end{cases} \quad \text{Eq. 6}$$

Equation 5 can be written in matrix notation as $$z^T - \sum_{i=1}^{p} \phi_i z^T \nabla^i = e^T - \sum_{j=1}^{q} \theta_j e^T \nabla^j,$$

or equivalently as $$e^T = z^T \left(I - \sum_{i=1}^{p} \phi_i \nabla^i\right)\left(I - \sum_{j=1}^{q} \theta_j \nabla^j\right)^{-1}.$$

Extending ARIMA based models to multivariate time series is straightforward. As noted earlier, the matrix B is constructed with the measurements at each time period $b_i$ as its columns. Using the transformations just described, the following is obtained:

$$E = Z\left(I - \sum_{i=1}^{p} \phi_i \nabla^i\right)\left(I - \sum_{j=1}^{q} \theta_j \nabla^j\right)^{-1}. \quad \text{Eq. 7}$$

Replacing Z by the matrix form of Equation 6, it is seen that E=BT is indeed a transformation given by right-multiplying B with a matrix T. In fact, any linear filtration of the elements of a time series can be modeled by a right multiplying matrix transformation. If the transformation is time-invariant, then the matrix in question will be Toeplitz (the values along diagonals will be constant). For anomaly detection, the forecast errors are identified as anomalous link traffic, $\tilde{B}=E$. That is, traffic behavior that cannot be well captured by the model is considered anomalous.

In another embodiment, Fourier analysis is used. Fourier analysis is the process of decomposing a complex periodic waveform into a set of sinusoids with different amplitudes, frequencies, and phases. The sum of these sinusoids can exactly match the original waveform. This lossless transform presents a new perspective of the signal under study (in the frequency domain), which has proved useful in very many applications.

For a discrete-time signal $x_0, x_1, \ldots, x_{N-1}$, the Discrete Fourier Transform (DFT) is defined by:

$$f_n = \frac{1}{N} \sum_{k=0}^{N-1} x_k e^{-jk2\pi n/N}, \text{ for } 0 \leq n \leq N-1,$$

where $f_n$ is a complex number that captures the amplitude and phase of the signal at the n-th harmonic frequency (with base frequency 1/N) and j denotes the $\sqrt{-1}$. Note that for a real signal $\{f_n\}$ is symmetric, i.e., $f_n = f_{N-1-n}$. Lower n corresponds to a lower frequency component, with $f_0$ being the DC component, or the average of the input series, and $f_n$ with n close to N/2 corresponding to high frequencies.

The Inverse Discrete Fourier Transform (IDFT) is used to reconstruct the signal in the time domain by $$x_n = \sum_{k=0}^{N-1} f_k e^{jk2\pi n/N} \text{ for } 0 \leq n \leq N-1.$$

An efficient way to implement the DFT and IDFT is through an algorithm known as the Fast Fourier Transform (FFT). The computational complexity of the FFT is O(N log(N)).

The FFT can be used to extract anomalous link traffic, $\tilde{B}$, by filtering out the low frequency components in the link traffic time series. In general, low frequency components capture the daily and weekly traffic patterns, while high frequency components represent the sudden changes in traffic behavior. Working in the frequency domain provides the opportunity to distinguish these two kinds of behaviors. FFT based anomography is as follows: First, transform link traffic B into the frequency domain: F=FFT(B): apply FFT on each row of B (recall that a row corresponds to the time series of traffic data on one link). The result is the corresponding frequency domain series, in each row of F. Second, remove low frequency components: i.e., set $F_i$=0, for $i \in [1,c] \cup [N-c,N]$, where $F_i$ is the i-th column of F and c is a cut-off frequency (for example, 10-minute aggregated link traffic data of one week duration can be used with c=171, corresponding to a frequency of one cycle per hour). Third, transform back into the time domain: i.e., take $\tilde{B}$=IFFT(F). The result is the high frequency components in the traffic data, which is used as anomalous link traffic, $\tilde{B}$.

The DFT and IDFT may be represented as right-matrix products. In setting columns of F to zero, and performing the IDFT we are taking a linear combination of the columns of F, which in turn are a linear combination of those of X. Hence, the overall process above can be modeled as a right-multiplying matrix transformation $\tilde{B}$=BT. Note also that in thresholding at frequency c, the symmetry of F is preserved, and so although F may contain complex elements, the resulting transform will be real.

In another embodiment, wavelets are used to extract anomalous link traffic. Wavelets are mathematical functions that segregate data into different frequency components, and then study each component with a resolution matched to its scale. They provide a powerful means for isolating characteristics of signals via a combined time-frequency representation and are often considered superior to traditional Fourier methods, especially in situations where the signal contains transients, such as discontinuities and sharp spikes.

As described below, $\tilde{B}$ can be computed as the high-frequency components of link traffic B. $\tilde{B}$ can also be computed as the mid-frequency components of B in essentially the same way. First, use wavelets to decompose B into different frequency levels: W=WAVEDEC(B), by applying a multi-level 1-D wavelet decomposition on each row of B. The result is a wavelet decomposition vector, which we save as one row in matrix W. An exemplary wavelet that can be used is the Daubechies wavelet of order 6. Second, remove low- and mid-frequency components in W by setting all coefficients at frequency levels higher than $w_c$ to 0. Here, $w_c$ is a cut-off frequency level. For example, 10-minute aggregated link traffic data of one week duration can be used, and $w_c$ can be set at 3. That is, only keep coefficients at frequency levels 1, 2, and 3. Third, reconstruct the signal: $\tilde{B}$=WAVEREC(B). The result is the high-frequency components in the traffic data.

It can be verified that the process of WAVEDEC and WAVEREC only involves linear combinations of columns of B. As a result, the $\tilde{B}$ derived through the wavelet based anomography can also be modeled as right multiplying matrix transformation.

In another embodiment, temporal PCA is employed to extract the link-level anomalies. Consider the link load matrix B=[$b_1$ $b_2$ ... $b_t$]. We can think of each row as a t-dimensional vector. What we are looking for is a new coordinate system, $v_1, v_2, \ldots, v_t$, such that the projection of the m links (on $v_1, v_2, \ldots, v_t$) has energy concentrated on the first several axes. This is exactly what PCA provides. PCA is applied on $B^T$. Then, an anomalous subspace is defined and anomalies that have projections in the anomalous subspace are extracted. In this way, we obtain a left multiplying transformation matrix T, i.e., $\tilde{B}$=TB$^T$. Taking transpose on both side of the equation, we have $\tilde{B}$=($\tilde{B}^T$)$^T$=(TB$^T$)$^T$=BT$^T$, where T$^T$ is a right multiplying transformation matrix that extracts anomalies from B. Note that unlike ARIMA, FFT, or wavelet based tomography, temporal PCA have the property that random reordering of the series, $b_1, b_2, \ldots, b_t$, does not affect the outcome of the algorithm.

Once the matrix of link anomalies $\tilde{B}$ is obtained (step 206 in FIG. 2), the next step is to reconstruct OD flow anomalies $\tilde{X}$ by solving a series of ill-posed linear inverse problems $\tilde{b}_j=A\tilde{x}_j$. Three embodiments of inference algorithms for solving these problems are described below. All three algorithms deal with the under-constrained linear system by searching for a solution that minimizes some notions of vector norm, three examples of which are:
1) The $l^2$ norm of a vector v is defined as $$\|v\|_2 = (\Sigma_i v_i^2)^{1/2},$$

where $v_i$ is the i-th element of vector v.
2) The $l^1$ norm of a vector v is defined as $\|v\|_1=\Sigma_i|v_i|$, i.e., the sum of the absolute value of each element of v.
3) The $l^0$ norm of a vector V is defined as $$\|v\|_0 = \Sigma_i v_i^0,$$

i.e., the number of non-zero elements of v.

One solution to $\tilde{b}=A\tilde{x}$ is the pseudoinverse solution $\tilde{x}=A^+\tilde{b}$, where $A^+$ is the pseudoinverse (or Moore-Penrose inverse) of matrix A. It is known that $\tilde{x}=A^+\tilde{b}$ is the solution to the problem $\tilde{b}=A\tilde{x}$ that minimizes the $l^2$ norm of the anomaly vector, i.e., it solves:

$$\text{minimize } \|\tilde{x}\|_2 \text{ subject to } \|\tilde{b}-A\tilde{x}\|_2 \text{ is minimal} \qquad \text{Eq. 8.}$$

In practice, we expect only a few anomalies at anyone time, so $\tilde{x}$ typically has only a small number of large values. Hence it is natural to proceed by maximizing the sparsity of $\tilde{x}$, i.e., solving the following $l^0$ norm minimization problem:

$$\text{minimize } \|\tilde{x}\|_0 \text{ subject to } \tilde{b}=A\tilde{x} \qquad \text{Eq. 9.}$$

The $l^0$ norm is not convex and is notoriously difficult to minimize, so in practice one needs to either approximate the $l^0$ norm with a convex function or use heuristics, for example, a greedy algorithm.

Another approach to approximate $l^0$ norm minimization is to convexify Equation 9 by replacing the $l^0$ norm with an $l^1$ norm. It can be shown that $l^1$ norm minimization results in the sparsest solution for many large under-determined linear systems.

$$\text{minimize } \|\tilde{x}\|_1 \text{ subject to } \tilde{b}=A\tilde{x} \qquad \text{Eq. 10.}$$

In the presence of measurement noise, the constraints $\tilde{b}=A\tilde{x}$ may not always be satisfiable. In this case, we can add a penalty term $\|\tilde{b}-A\tilde{x}\|_1$ to the objective and reformulate Equation 10 as:

$$\text{minimize } \lambda\|\tilde{x}\|_1+\|\tilde{b}-A\tilde{x}\|_1 \qquad \text{Eq. 11,}$$

where $\lambda \in [0,1]$ controls the degree to which the constraints $\tilde{b}=A\tilde{x}$ are satisfied. For example, $\lambda$=0.001.

Equation 11 can be cast into the following equivalent Linear Programming (LP) problem, for which solutions are available even when A is very large, owing to modern interior-point linear programming methods:

$$\text{minimize } \lambda\Sigma_i u_i+\Sigma_j v_j$$

$$\tilde{b}=A\tilde{x}+z$$

$$\text{subject to } u \geq \tilde{x}, u \geq -\tilde{x}$$

$$v \geq z, v \geq -z \qquad \text{Eq. 12.}$$

Note that it is common to use $\|\tilde{b}-A\tilde{x}\|_2^2$ (instead of $\|\tilde{b}-A\tilde{x}\|_1$) as the penalty term in Equation 11. This alternative formulation can be efficiently solved using methods like Iterative Reweighted Least Squares and has been successfully applied to recover sparse overcomplete representations in the presence of noise.

Another heuristic solution to $l^0$ norm minimization is to apply the greedy algorithm. For example, the greedy heuristic has been successfully applied to wavelet decomposition, where it goes by the name of Orthogonal Matching Pursuit (OMP). Following a similar technique, a greedy solution can be used to maximize the sparsity of $\tilde{x}$. The algorithm starts with an empty set I of non-zero positions for $\tilde{x}$ and then iteratively add new non-zero positions to I. During each iteration, for each position $p \notin I$, the algorithm tests how much it can reduce the residual $\tilde{b}-A\tilde{x}$ by including p as a non-zero position. More specifically, let J=I$\cup$\{p\}. The algorithm estimates the values for the non-zero elements of $\tilde{x}$ (denoted as $\tilde{x}_J$) by solving the following least squares problem:

$$\text{minimize } \|\tilde{b}-A_J\tilde{x}_J\|_2 \qquad \text{Eq. 13,}$$

where $A_J$=A[.,J] is a submatrix of A formed by the column vectors of A corresponding to positions in J. The residual is then computed as $e_J=\|\tilde{b}-A_J\tilde{x}_J\|_2$. The algorithm then greedily chooses the position p that gives the smallest $e_J$ and add it to I. The algorithm stops whenever either the residual energy falls below some tolerable inaccuracy $e_{max}$ or the number of non-zero positions exceeds some threshold $l_{max}^0$.

An exemplary pseudo-code representation of the greedy algorithm described above is as follows:

```
1    greedyMaxSparsity (A,b̂,l_max^0,e_max) {
2    initialization:
3        // I is the current set of non-zero positions
4        I = ∅; x̃_I = 0, e_I = ‖b̂‖_2
5        while (|I| < l_max^0 and e_I > e_max)
6            I_0 = I
7            for (each p ∈ {1,...,n} - I_0)
8                J = I_0 ∪ {p}         // new non-zero positions
9                A_J = A[.,J]          // column vectors J
10               x̃_J = A_J^+ b̂         // pinv solution to A_J x̃_J = b̂
11               e_J = ‖A_J x̃_J - b̂‖_2  // the new residual energy
12               if (e_J < e_I)
13                   // greedily update I, x̃_I, and e_I
14                   I = J ; x̃_I = x̃_J ; e_I = e_J
15               endif
16           endfor
17       endwhile
18       x̃ = 0; x̃[I] = x̃_I
19       return x̃
20   }
```

In the above embodiments, it is assumed that the routing matrices are constant. In another embodiment, we wish to allow for dynamic routing changes, and so we must allow $A_j$ to vary over time. In addition, if some measurements are missing (say at time j), we may still form a consistent problem by setting the appropriate row of $A_j$ to zero. Thus, for realistic SNMP measurements where missing data are often an issue, we still wish to vary $A_j$ even for static routing. Note that we assume that the routing measurements are obtained via a route monitor which gives us accurate, up-to-date measurements of routing (at least at the time scale of SNMP measurements, e.g. minutes).

When the routing matrix is non-constant, there is no reason to believe that the measurements B should follow a simple model such as an ARIMA model. Even where the traffic itself follows such a model, a simple routing change may change a link load measurement by 100%, for instance by routing traffic completely away from a particular link. If we were to apply the ARIMA model to the measurements B, we would see such a change in routing as a level-shift anomaly. However, its cause is not an unknown change in X (to be discovered), but rather a known change in the routing matrices $A_j$. Likewise, it no longer makes sense to try to exploit spatial correlations which arose from a particular routing, to the case of another routing.

However, it is no less reasonable to approximate the traffic matrix X by an ARIMA model (than B when the routing is constant), even when routing may change. Under such a modeling assumption, we can write $\tilde{X} = XT$. We know also that the measurements are given by Equation 2. An approach to the solution is therefore to seek a solution $\tilde{X}$ that is consistent with these equations, but also minimizes one of the norms (described above) at each time step. We choose to minimize the $l^1$ norm $\|\tilde{x}_j\|_1$ here because: (i) it allows us to naturally incorporate link load constraints at multiple time intervals; and (ii) it is more accurate than both the pseudoinverse and the greedy algorithms for static anomography.

Unfortunately, for transform based methods (the Fourier, wavelet, and PCA methods) the number of constraints becomes very large (as t grows). On the other hand, the set of constraints for the ARIMA model can be written in a form such that it does not grow with t. Hence, in the following we concentrate on generalizing the ARiMA approach. We first present the basic algorithm for ARIMA(p, d, q) models with $d \geq 1$. To improve its efficiency, we develop two simple techniques that significantly reduce the problem size. Those skilled in the art will appreciate that the algorithm can also be extended to handle ARIMA models with d=0. We will also discuss model selection and parameter estimation, two important issues for applying ARIMA-based anomography.

We are going to seek solutions that are consistent with the measurements $b_j = A_j x_j$, for j=1, ..., t, and an ARIMA model that gives $\tilde{X} = XT$, where T is the same transformation matrix implicitly defined by Equation 6 and Equation 7. Importantly, we do not wish to have to estimate X (or we may as well use an early-inverse method). The advantage of the ARIMA model is we do not need to know X, but only linear combinations of X.

Let L be the backshift operator, whose effect on a process z can be summarized as $(Lz)_k = z_{k-1}$. Let the AR polynomial $\Phi(L)$ be:

$$\Phi(L) = \sum_{i=0}^{d+p} \gamma_i L^i \stackrel{def}{=} \left(1 - \sum_{i=1}^{p} \phi_i L^i\right)(1-L)^d.$$

Let $y_{k-i} = \gamma_i x_{k-i}$. We now identify $e = \tilde{x}$ in the ARIMA model described in Equation 5 (or rather its multivariate extension). By definition the sum $$\sum_{i=0}^{d+p} y_{k-i} = z_k - \sum_{i=1}^{p} \phi_i z_{k-i}$$

and so, for $d \geq 1$, the ARIMA model (Equation 5) can be rewritten:

$$\sum_{i=0}^{d+p} y_{k-i} = \tilde{x}_k - \sum_{j=1}^{q} \theta_j \tilde{x}_{k-j}. \quad \text{Eq. 14}$$

Define $c_{k-i} = \gamma_i b_{k-i}$, then as $y_{k-i} = \gamma_i x_{k-i}$, the measurement equation (2) implies $$A_{k-i} y_{k-i} = c_{k-i}, i=0,1,\ldots, d+p \quad \text{Eq. 15.}$$

We can compute $\tilde{x}_1, \tilde{x}_2, \ldots, \tilde{x}_t$ iteratively by solving a series of $l^1$ norm minimization problems $P_k$ (k=1,2, ..., t):

$$P_k: \text{minimize } \|\tilde{x}_k\|_1 \text{ subject to Equations 14 and 15} \quad \text{Eq. 16}$$

As an illustrative example, consider the simplest ARIMA model, ARIMA(0,1,0). In this case, p=q=0, so we can write:

$$\Phi(L) = \sum_{i=0}^{1} \gamma_i L^i = (1-L),$$

so $\gamma_0 = 1$, $\gamma_1 = -1$, and Equation 14 becomes $$\tilde{x}_k = \sum_{i=0}^{1} y_{k-i},$$

thus problem $P_k$ is:

$$\text{minimize } \|\tilde{x}_k\|_1$$

$$\text{subject to } \begin{cases} \tilde{x}_k = y_k + y_{k-1} \\ A_k y_k = b_k \\ A_{k-1} y_{k-1} = -b_{k-1}. \end{cases} \quad \text{Eq. 17}$$

We apply zero-padding to handle the initial condition when $k \leq q$ or $k \leq d+p$. Specifically, for the MA part of the model, we set $\tilde{x}_{k-j}$ to 0 whenever $k \leq j$. For the AR part of the model, we apply zero-padding on the differenced series $\{(1-L)^d x_i\}$, which can be achieved by redefining the AR polynomial $\Phi(L) = \Sigma_i \gamma_i L^i$ as $$\Phi(L) \overset{def}{=} \begin{cases} \left(1 - \sum_{i=1}^{p} \phi_i L^i\right)(1-L)^d & \forall k > d+p \\ \left(1 - \sum_{i=1}^{k-d} \phi_i L^i\right)(1-L)^d & \forall k \in (d, d+p] \\ 0 & \forall k \leq d \end{cases}$$

Similar to above, we can accommodate measurement noise by incorporating penalty terms into the objective to penalize against violation of constraints (Eq. 14) and (Eq. 15). We can then solve the resulting $l^1$ norm minimization problem by reformulating it as an equivalent LP problem.

One potential problem with the above algorithm is its high computational cost. Even though the computational cost is fixed relative to t, it is still highly dependent on the number of traffic matrix elements n, and the order parameters (p, d, q), and so the $l^1$ minimization problem $P_k$ can be very large even when $A_{k-i}$ stays constant. In contrast, the static anomography algorithm had quite good computation properties for constant $A_j$. Below, two techniques are described to significantly reduce the size of $P_k$. These techniques are result by the following observations: (i) the routing matrices are often quite stable and tend not to change in every time interval; and (ii) when the changes occur, they tend to be local changes and most rows of the routing matrix will remain the same.

The first technique reduces the problem size by merging constraints for intervals with the same routing matrix. Specifically, if there exist $i_1 < i_2$ such that $A_{k-i_1} = A_{k-i_2}$, we can use a single unknown vector $y'^{k-i}_1$ to represent $y_{k-i_2} + y_{k-i_1}$ in Equation 14 and then replace the two sets of constraints on $y_{k-i_1}$ and $y_{k-i_2}$ in Equation 14 with a single set of constraints on $y'_{k-i_1}$:

$$A_{k-i_1} y_{k-i_1} = c_{k-i_1} \overset{def}{=} c_{k-i_1} + c_{k-i_2}$$

We can repeat this process until all $A_{k-i}$ are distinct.

The second technique exploits the fact that there is often a large subset of rows common to all $A_{k-i}$. Before describing the technique, we first introduce some notations. Let S be a set of integers. Given a matrix M, let $M^S$ be the sub matrix of M that consists of all rows with indices in S. Similarly, given a vector v, let $v^S$ be the sub-vector of v that consists of elements with indices in S.

Using the above notations, let C be the set of row indices such that all $A_{k-i}^C$ are equal (denoted by $A^C$). Let $\overline{C}$ be the set of row indices not in C. We can then decompose Equation 15 into $$A^C y_{k-i} = c_{k-i}^C, \quad i = 0, 1, \ldots, d+p \quad \text{Eq. 18}$$

$$A_{k-i}^{\overline{C}} y_{k-i} = c_{k-i}^{\overline{C}}, \quad i = 0, 1, \ldots, d+p \quad \text{Eq. 19}$$

Summing up all the constraints in Equation 18 over i, we obtain:

$$A^C \sum_{i=0}^{d+p} y_{k-i} = \sum_{i=0}^{d+p} c_{k-i}^C. \quad \text{Eq. 20}$$

Combining Equation 20 and Equation 14, we get a single set of constraints on $\tilde{x}_k$:

$$\sum_{i=0}^{d+p} c_{k-i}^C = A^C \tilde{x}_k - A^C \sum_{j=1}^{q} \theta_j \tilde{x}_{k-j}. \quad \text{Eq. 21}$$

We can then replace Equation 18 with Equation 21, reducing $P_k$ to:

$$\text{minimize } \|\tilde{x}_k\|_1 \text{ subject to Eqs. 14, 19, and 21} \quad \text{Eq. 22.}$$

In the special case when $A_j$ is time invariant, we have C=0. So the constraints $y_{k-i}$ (Eq. 19) become empty, causing $y_{k-i}$ to become free variables in Equation 22. In this case, we can further simplify Equation 22 by eliminating $y_{k-i}$ and the corresponding constraint Equation 14, resulting in $$\text{minimize } \|\tilde{x}_k\|_1 \text{ subject to Equation 21} \quad \text{Eq. 23.}$$

It can be verified that Equation 23 is equivalent to our original algorithm for time invariant $A_j$, which first computes $\tilde{B}$ by applying ARIMA modeling on B and then estimates $\tilde{x}_k$ by minimizing $\|\tilde{x}_k\|_1$ subject to $\tilde{b}_k = A\tilde{x}_k$. This is appealing in that we now have one unified algorithm for ARIMA-based anomography.

Below, we address two important issues on applying ARIMA type models: model selection (i.e., determining p, d, q) and parameter estimation (i.e., determining coefficients $\phi_i, \theta_j$). We do so by answering the following three questions. What data to use; How to estimate $\phi_i, \theta_j$ given (p, d, q); and How to select the model order (p,d, q).

The first question is what data to use for model selection and parameter estimation. This is important because the data determines the model and the parameters that we can learn. In the context of network anomography, we would like the model and parameters to capture the normal behavior of $x_i$. For this purpose, we propose to select our models and parameters based on the traffic aggregated at different ingress points. More specifically, let I be the set of indices corresponding to all the ingress points in the link load vectors $b_i$. We will use the series of sub-vectors $b_i^I$ as the input data for model selection and parameter estimation.

This has several advantages. First, $b_i^I$ is readily available and does not require any inference. More importantly, ingress traffic is largely invariant to internal topology and routing changes in the local domain under consideration, making our algorithms applicable even in the presence of topology and routing changes. In addition, each element of $b_i^I$ aggregates a number of OD flows. So the effect of anomalies or missing data on individual OD flows is less significant, making our results more robust.

To estimate $\phi_i, \theta_j$, given (p, d, q) and input vector series $\{b_k^I\}$, we can estimate the autoregression and moving-average coefficients $\phi_i, \theta_j$ by constructing a state-space model and then applying the standard Kalman filter adaptation.

To select the model order, we first select the degree of differencing (d). The optimal degree of differencing is often the one at which the standard deviation of the differenced series is the lowest. We can apply this rule to determine d. More specifically, for each $d \in \{0,1,2,3,4\}$, we compute the differenced series $$Z_d = [z_{d,1} z_{d,2} \ldots z_{d,t}] = (1-L)^d [b_1^I b_2^I \ldots b_t^I]$$

Let $$E[Z_d] = \frac{1}{t} \sum_{i=1}^{t} z_{d,i}$$

and $$V[Z_d] = \frac{1}{t} \sum_{i=1}^{t} \|z_{d,i} - E[Z_d]\|_2^2.$$

We then pick the d that results in the minimum variance $V[Z_d]$.

Once we have d, we can automate the choice of p and q by applying an information based criterion such as the AIC (Akaike's Information Criterion) or AICC. Information based criteria are designed to achieve a good balance between model parsimony and low prediction error.

Figure 3:
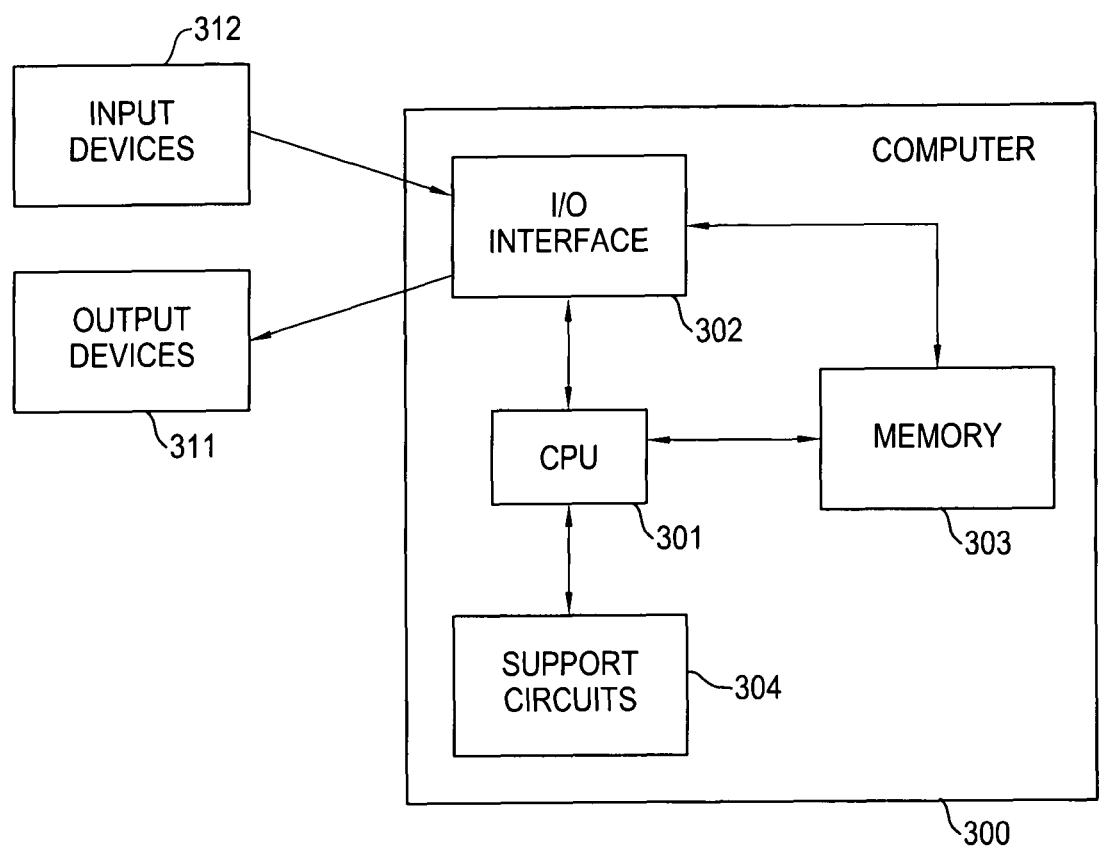
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. Notably, computer 300 may be used to implement the network-level anomaly analyzer 116 of FIG. 1 and the method 200 of FIG. 2. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, and the like.

The memory 303 may store all or portions of one or more programs and/or data to implement the processes and methods described herein. Notably, the memory 303 may store program code to be executed by the CPU 301 for implementing the network-level anomaly analyzer 116 of FIG. 1 and performing the method 200 of FIG. 2. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of network-level anomaly inference in a network, comprising:
   obtaining link load measurements for multiple time intervals, wherein each of the link load measurements is a load measurement for a link;
   obtaining routing data for the network;
   extracting link level anomalies using temporal analysis of the link load measurements over the multiple time intervals for the link; and
   inferring network-level anomalies from the link level anomalies and the routing data by reconstructing origin-destination flow anomalies by solving a series of ill-posed linear inverse problems.

2. The method of claim 1, wherein the temporal analysis comprises an autoregressive integrated moving average modeling.

3. The method of claim 1, wherein the temporal analysis comprises a principle components analysis.

4. The method of claim 1, wherein the temporal analysis comprises a fourier analysis.

5. The method of claim 1, wherein the temporal analysis comprises a wavelet analysis.

6. The method of claim 1, wherein the network-level anomalies are inferred using an inference algorithm.

7. The method of claim 1, wherein the network-level anomalies are inferred using non-constant routing matrices.

8. Apparatus for network-level anomaly inference in a network, comprising:
   means for obtaining link load measurements for multiple time intervals, wherein each of the link load measurements is a load measurement for a link;
   means for obtaining routing data for the network;
   means for extracting link level anomalies using temporal analysis of the link load measurements over the multiple time intervals for the link; and
   means for inferring network-level anomalies from the link level anomalies and the routing data by reconstructing origin-destination flow anomalies by solving a series of ill-posed linear inverse problems.

9. The apparatus of claim 8, wherein the temporal analysis comprises an autoregressive integrated moving average modeling.

10. The apparatus of claim 8, wherein the temporal analysis comprises a principle components analysis.

11. The apparatus of claim 8, wherein the temporal analysis comprises a fourier analysis.

12. The apparatus of claim 8, wherein the temporal analysis comprises a wavelet analysis.

13. The apparatus of claim 8, wherein the network-level anomalies are inferred using an inference algorithm.

14. The apparatus of claim 8, wherein the network-level anomalies are inferred using non-constant routing matrices.

15. A non-transitory computer readable medium having stored thereon instructions that, when executed by a processor, cause the processor to perform a method of network-level anomaly inference in a network, comprising:

obtaining link load measurements for multiple time intervals, wherein each of the link load measurements is a load measurement for a link;

obtaining routing data for the network;

extracting link level anomalies using temporal analysis of the link load measurements over the multiple time intervals for the link; and inferring network-level anomalies from the link level anomalies and the routing data by reconstructing origin-destination flow anomalies by solving a series of ill-posed linear inverse problems.

16. The non-transitory computer readable medium of claim 15, wherein the temporal analysis comprises an autoregressive integrated moving average modeling.

17. The non-transitory computer readable medium of claim 15, wherein the temporal analysis comprises a principle components analysis.

18. The non-transitory computer readable medium of claim 15, wherein the temporal analysis comprises a fourier analysis.

19. The non-transitory computer readable medium of claim 15, wherein the temporal analysis comprises a wavelet analysis.

20. The non-transitory computer readable medium of claim 15, wherein the network-level anomalies are inferred using an inference algorithm.

\* \* \* \* \*